J. B. THOMAS.
Instruments for Measuring Distances.
No. 155,124.            Patented Sept. 15, 1874.
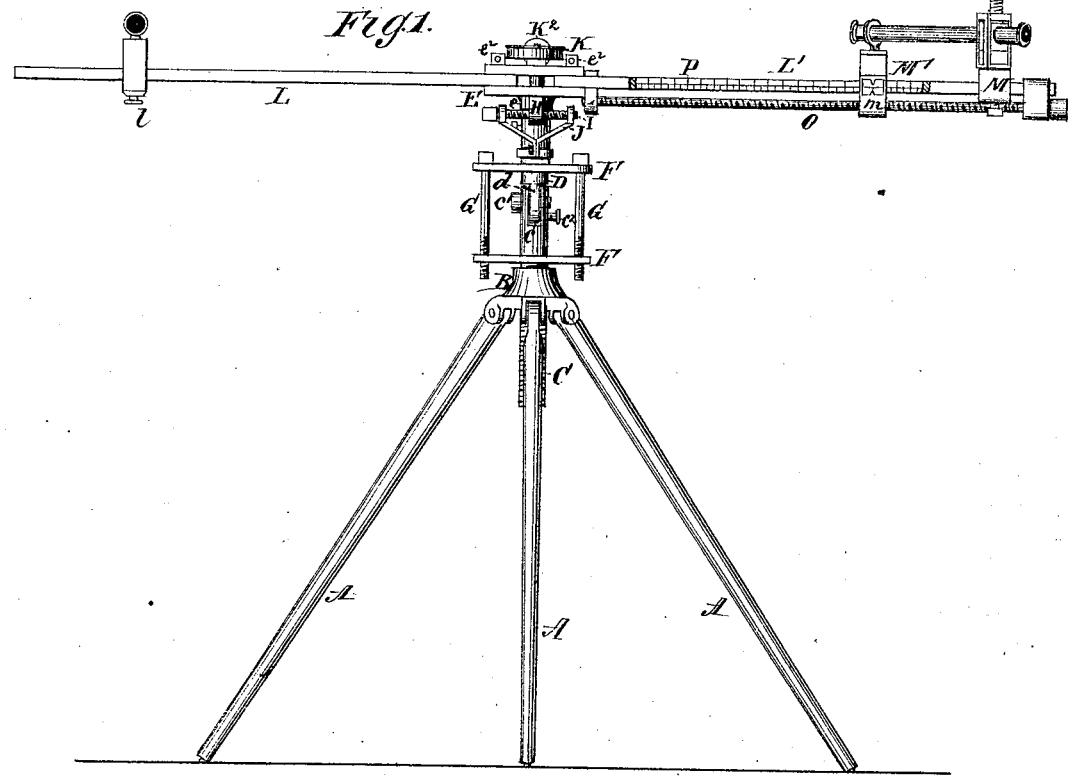
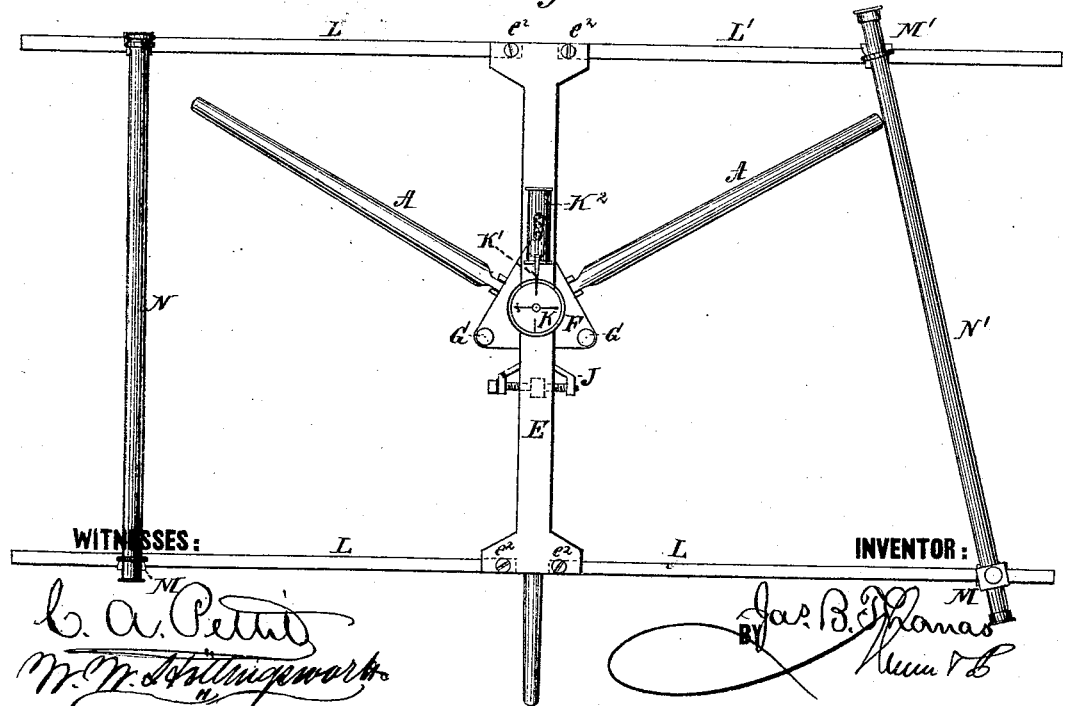
WITNESSES:          INVENTOR:
ATTORNEYS.

UNITED STATES PATENT OFFICE.

JAMES B. THOMAS, OF MONTGOMERY, OHIO.

IMPROVEMENT IN INSTRUMENTS FOR MEASURING DISTANCES.

Specification forming part of Letters Patent No. 155,124, dated September 15, 1874; application filed August 6, 1874.

*To all whom it may concern:*

Be it known that I, JAMES B. THOMAS, of Montgomery, in the county of Hamilton and State of Ohio, have invented a new and Improved Instrument for Measuring Distances; and I do hereby declare that the following is a full, clear, and exact description of the same, reference being had to the accompanying drawing, forming a part of this specification, in which—

Figure 1 is a side elevation, and Fig. 2 a plan view.

The invention relates to instruments for measuring distances; and consists in certain improvements thereon, which will first be fully described, and then pointed out in the claims.

A A A represent legs, hinged to a nut-socket, B, that receives the screw C. The latter is hinge-jointed, by mortise and tenon $c\ d$, with the support D, on which centrally rests the double bar E. $c^1$ is a joint-pivot, and $c^2$ a clamp-screw, by which the support D is held in a perpendicular position. In order re-enforce this clamp-screw and hold the bar E firmly and securely I use two plates, F F, one on the screw C and the other on the support D, and connect these plates by screw-bolts G G G. The bar E has a socket, $e$, which receives the upper end of support D, and is made fast by a set-screw, while it is provided with a fixed pendent nut, H, that receives the screw I of bracket J. K $K^1$ $K^2$ represent the compass-scale, pointer, and level, which are employed in the usual manner. At each end of bar E is pivoted or clamped, by the same pivot-screws $e^2\ e^2$, the rods L L', and on each opposite two of these rods are held in sliding carriages M, and swiveled thereon, the telescopes N N'. One of the carriages, M, is nut-threaded beneath and moved by a long swiveled screw, O. P represents a scale of distances on the rod L'.

The operation is as follows: The telescope N being placed at right angles to rods L L' and brought into line, so as to sight the object whose distance is to be measured, the operator turns the long screw O until the carriage brings telescope N' also to bear upon the object. The scale will show, by the carriage-pointer $m$, the exact distance required.

The points of graduation on the scale may be obtained from actual measurement of a single rod or other unit of measure, and a calculation of the succeeding ones, or may all be obtained or verified by actual measurement. The accuracy of the scale may thus be made indubitable, and the result of each measurement even more accurate than by the ordinary chain measurement. By removing the screw-bolts G the instrument is made to turn on hinge-joint and measure perpendicular altitudes, or those at any desired obliquity.

The rods L L', being pivoted, may be folded in line with bar E, while the hinged legs may be folded up with the screw and support C D, or the rods and bars may be carried separately by loosening the screw which fastens the socket of bar E to the support D.

In practice, the rods have corresponding graduated scales, beginning at zero near cross-bar E, increasing outwardly, so that one telescope may always be exactly at right angles to the rods, no matter to what distance outward it is moved, while the other may be moved out to the same distance, and then turned on the rear carriage as a center, until it is also aligned with the object. Each carriage may be provided with a pointer, if desired.

Having thus described my invention, what I claim as new is—

1. The combination, with rods L L', of the sliding carriages M and telescopes N N', as and for the purpose described.

2. The described combination, with bar E, of the pivoted rods that hold carriages on which telescopes are swiveled, to enable the whole to fold up in the manner set forth.

3. The screw C and support D, hinged together, in combination with plates and screw-bolts, to secure them in a horizontal position.

4. The combination of the hinged legs and socket A B, hinged screw and support C D, hinged bar E, and rods L, all constructed and put together to support the telescopes in sliding carriages, as set forth.

JAMES B. THOMAS.

Witnesses:
 CHAS. A. PETTIT,
 W. W. HOLLINGSWORTH.